(12) United States Patent
Dupey et al.

(10) Patent No.: US 9,501,504 B2
(45) Date of Patent: Nov. 22, 2016

(54) AUTOMATIC DETECTION OF POTENTIAL DATA QUALITY PROBLEMS

(71) Applicants: Ron Dupey, La Crosse, WI (US); Prasanthi Thatavarthy, La Crosse, WI (US); Jeff Woody, La Crosse, WI (US)

(72) Inventors: Ron Dupey, La Crosse, WI (US); Prasanthi Thatavarthy, La Crosse, WI (US); Jeff Woody, La Crosse, WI (US)

(73) Assignee: SAP SE, Walldorf (DE)

( * ) Notice: Subject to any disclaimer, the term of this patent is extended or adjusted under 35 U.S.C. 154(b) by 346 days.

(21) Appl. No.: 14/451,011

(22) Filed: Aug. 4, 2014

(65) Prior Publication Data
US 2016/0034502 A1    Feb. 4, 2016

(51) Int. Cl.
*G06F 17/30*    (2006.01)

(52) U.S. Cl.
CPC .............................. *G06F 17/30303* (2013.01)

(58) Field of Classification Search
None
See application file for complete search history.

(56) References Cited

U.S. PATENT DOCUMENTS

| 2004/0225543 A1* | 11/2004 | Kapochunas ..... G06F 17/30306 705/7.37 |
| 2015/0006491 A1* | 1/2015 | He .................... G06F 17/30575 707/694 |

* cited by examiner

*Primary Examiner* — William Spieler
(74) *Attorney, Agent, or Firm* — Fountainhead Law Group P.C.

(57) ABSTRACT

Technical solutions for detection potential data quality problems are provided. In some implementations, a method includes: automatically without human intervention, identifying a subset of side effect data associated with a set of enterprise data. The side effect data include a plurality of data fields. The method further includes: selecting a first set of data quality detection rules in accordance with a first data field in the plurality of data fields; identifying one or more candidate data quality problems in the set of side effect data by comparing the set of side effect data to the first set of data quality detection rules; and responsive to identifying the one or more candidate data quality problems: causing to be displayed to a user: information representing the one or more candidate data quality problems; and one or more candidate solutions for correcting the one or more candidate data quality problems.

20 Claims, 6 Drawing Sheets

AUTOMATIC DETECTION OF POTENTIAL DATA QUALITY PROBLEMS

BACKGROUND

Detecting data quality problems—especially within enterprise data—is important: without quality data to begin with, accurate business intelligence cannot be derived; nor critical strategies executed.

One challenge for managing enterprise data (EDM) involves comparing data obtained from various (e.g., internal and external) data sources. In many circumstances, these data sources use inconsistent terms and definitions to describe data, rendering it difficult to compare or exchange data across different sources, to automate business processes, and to provide a uniform data structure for data consumption/analysis by other (e.g., ERP) applications. Difficulties in data mapping and cross-referencing often follow. Normalization (of terms and definitions) at data attribute level is referred to as the metadata component of EDM and is an essential prerequisite for effective data management.

Difficulties abound, however. One technical problem is that special skills, such as expert knowledge of a large number of data formats/syntax is often required in discerning potential data quality problems. For example, a user is usually required to know what a full P.O. Box address in Japan looks like in order to determine whether a given address is likely to be correct or otherwise. Other examples include format for landline numbers in Brazil, syntax for residential postal addresses in China, and naming conventions for street names in Japan.

Another technical problem is that, even with expert knowledge, examining enterprise data manually is both time- and resource-consuming. For example, it may take weeks (or even months) for a data analyst to go through spreadsheets containing phone numbers collected from 10 cities in South Korea, in order to make sure these data can (or should) be used to form best records.

There therefore is a need for improved techniques for detecting potential data quality problems.

DETAILED DESCRIPTION

The implementations described herein provide various technical solutions to detecting potential data quality problems, e.g., within enterprise data, and in particular to the above-identified technical problems—by providing techniques for automatically detecting potential data quality problems and proposing potential solutions thereto to a user.

For reasons explained above, enterprise data often need to be processed (e.g., cleansed or matched) in order to form best records and to further derive business intelligence. At various stages of processing the enterprise data, data quality detection operations may be performed to ensure that potential data quality problems are detected (and corrected) as early as possible, so as to avoid costly re-runs or potential destruction to the enterprise data (e.g., after best records have been integrated back into the enterprise data).

As a non-limiting example, a cleansing operation in some cases generates side effect data that describe potential data quality problems within the enterprise data, as does a matching operation or a best-record forming operation.

Then, specific data quality detection rules are selected based on the side effect data. For example, if (A) the "Country" column in a side effect data set includes only the value "USA," and (B) the "Address Type" column includes only "Residential Postal Address"; then syntax rules governing residential postal addresses in the United States are selected (e.g., a street number must precede a street name, and a zip code should include only numeric values and optionally a hyphen).

Next, to detect potential data quality problems, these side effect data are compared against the selected rules, and potentially non-conforming data entries are identified for resolution by a user. For example, all values in the "Address" column in the above side effect data set are compared against syntax rules governing residential postal addresses in the United States, and addresses that do not fit known formats for U.S. postal addresses are identified and sometimes a summary thereof provided to a data integrator.

Besides the non-conforming (and thus suspect) data entries, potential solutions for resolving these potential data quality problems are also provided to a user. To continue with the above example, when an address entry includes an alpha-numeric zip code (e.g., 94403-ABC), a "remove non-numeric values in ZIPs" option is provided to a user. Optionally, after corrective user actions are taken, a comparison (e.g., by way of a bar chart or a pie chart) of before-and-after data qualities is provided.

In these ways, potential data quality problems are detected and corrected without requiring a user (e.g., the owner of the enterprise data) to know all data nuances, thereby enhancing data quality and improving business intelligence without undue burden to a user.

Additional details of implementations are now described in relation to the figures.

Figure 1:
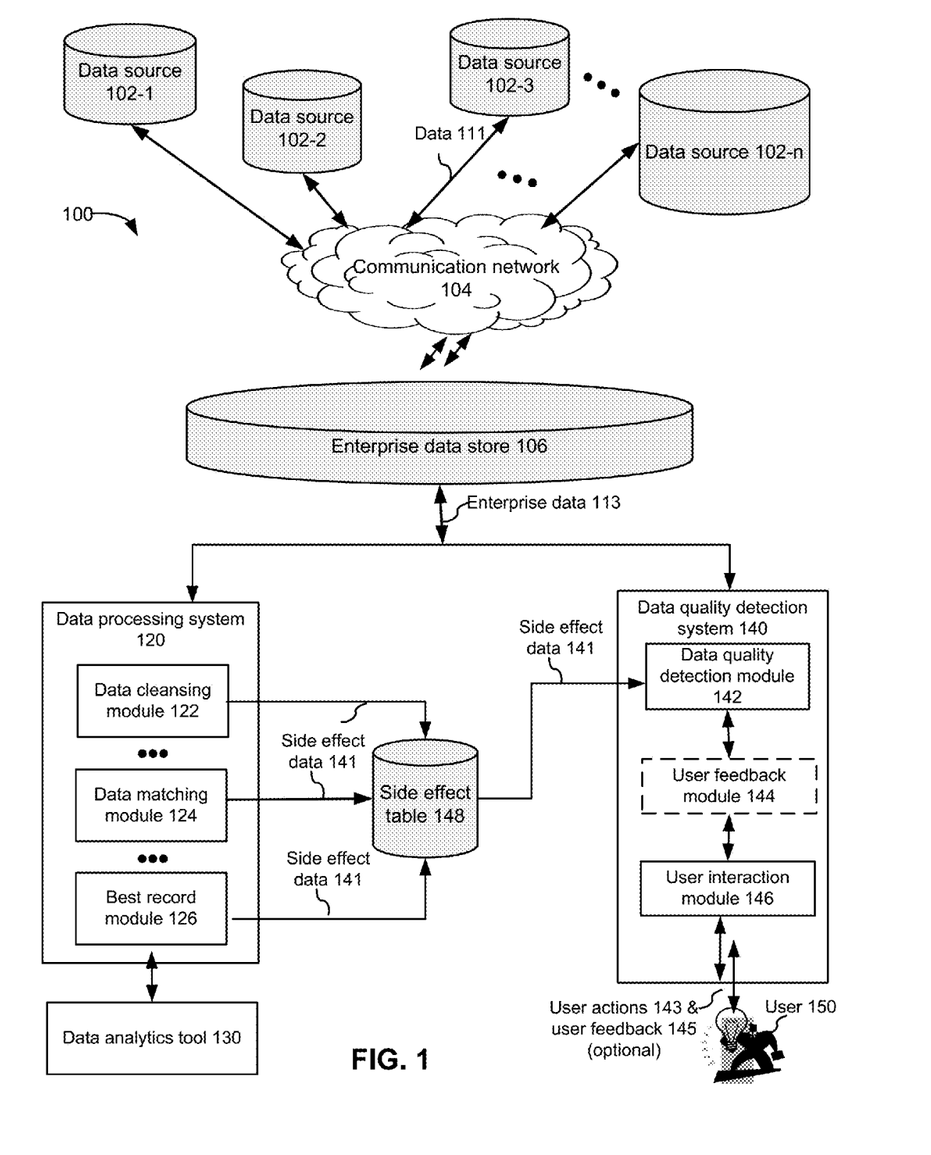
FIG. 1 is an example block diagram illustrating a computing system for detecting potential data quality problems, in accordance with some implementations.

FIG. 1 is an example block diagram illustrating a computing system for detecting potential data quality problem, in accordance with some implementations.

In some implementations, the computing system 100 includes one or more data sources 102 (e.g., 102-1, 102-2, . . . , and 102-*n*), a communication network 104, an enterprise storage 106, a data processing system 120 (optional), a data analytics tool 130 (optional), and a data quality detection system 140.

In some implementations, a data source 102 includes a MICROSOFT SQL Server database, an Oracle database, a SYBASE database, a MICROSOFT EXCEL workbook, a spreadsheet, a plain text file, an XML file, a text file, information manually entered by a user, or any other data 111.

In some implementations, the communication network 104 interconnects one or more data sources 102 with each other, and with the enterprise storage 106. In some implementations, the communication network 104 optionally includes the Internet, one or more local area networks (LANs), one or more wide area networks (WANs), other types of networks, or a combination of such networks.

In some implementations, the enterprise storage 106 stores and manages enterprise data 113, e.g., for analysis by the analytics tool 130. In some implementations, the enterprise data includes business data, such as sales/expenses/ revenues, customer profiles, and supplier profiles. In some implementations, the enterprise storage 106 is implemented using transitory storage (e.g., RAM and flash memory) and non-transitory storage (e.g., hard drive, ROM, DVD, and tape).

In some implementations, the data processing system 120 processes enterprise data 106 (e.g., obtained from the enterprise storage 106), and provides the processed data to the analytics tool 130, e.g., an SAP ERP application. In some implementations, the data processing system 120 includes a data cleansing module 122, a data matching module 124, and a best record module 126.

In some implementations, the data cleansing module 122 detects, corrects, or removes corrupted or inaccurate records/data entries from enterprise data. In some implementations, the data matching module 124 processes missing, conflicting, and corrupted data in accordance with business rules and concept models, detects non-matching information, discerns asserted linking (associate) information in addition to direct matching, and derives non-obvious relationships and association among different data sets. In some implementations, the best record module 126 generates best records based on cleansed and matched data. These best records are then used to derive business intelligence and strategy, e.g., using a data analytics tool.

In some implementations, the data cleansing module 122 generates side effect data 141 that describe potential data quality problems within the processed enterprise data. For example, a cleanse operation can output extraneous data (e.g., an incorrect company name) to a side effect table 148. For another example, misspelled names within name entries are also saved to the side effect able 148.

In some implementations, the data matching module 124 also generates side effect data 141 and saves them into the side effect table 148, so does the best record module 126. For example, a street address that cannot be matched to any known USPS addresses is saved in the side effect data 148; and business records missing critical business information (e.g., recent revenue) are also saved in the side effect table 148.

In some implementations, side effect data are generated after each stage of the data processing, e.g., after a cleaning operation, after a matching operation, and after a best record forming operation.

In some implementations, the data analytics tool 130 includes one or more data analysis applications, e.g., by SAP, QLIK, or TABLEAU. In some implementations, the data analytics tool 130 is executed on platforms provided by SAP, ORACLE, AMAZON WEB SERVICES, IBM, or PIVOTAL.

In some implementations, the data quality detection module 140 detects potential data quality problems and provides potential solutions to a user. In some implementations, the data quality detection module 140 includes a data quality detection module 142, a user feedback module 144, a user interface module 146, and a side effect database 148.

In some implementations, the data quality detection module 142 identifies potential data quality problems within a data set in accordance with reference data or reference rules and proposes solutions thereto. For example, to detect potential problems within 1,000 data entries containing commercial addresses in China, the detection module 142 selects reference data (e.g. an example commercial address in China) or reference rules (e.g., known commercial address syntax) and compares the data entries against the selected reference data or reference rules.

In some implementations, the user feedback module 144 collects user feedback 145 to one or more identified data quality problems. For example, if a user has chosen, on the past 10 occasions, to ignore potential errors relating to zip code in customer addresses, the data quality detection module 142 may de-prioritize (e.g., forgo) detection relating to zip code errors.

In some implementations, the user interface module 146 interacts with a user 150, e.g., obtaining user actions 143 and formatting application output to the user 150. In some implementations, the side effect database 148 stores and manages side effect data 141 (e.g., metadata) relating to potential data quality problems detected by the data quality detection module 142.

Figure 2:
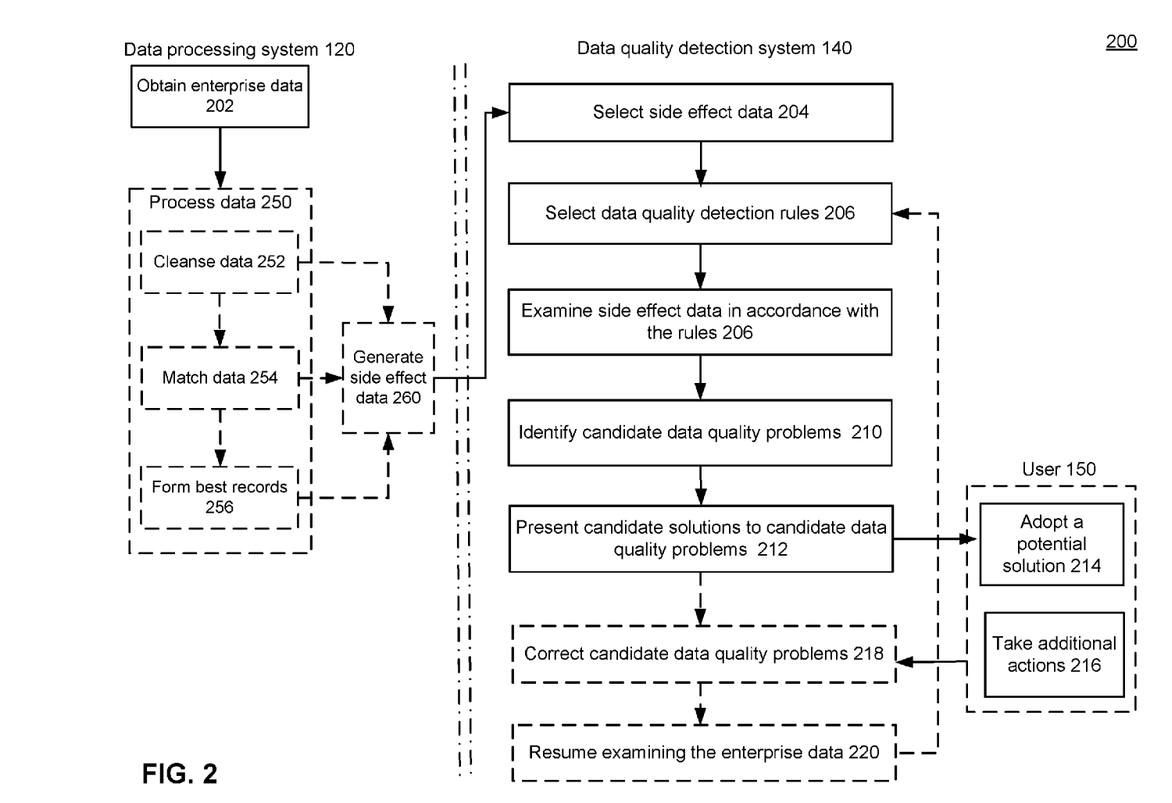
FIGS. 2-3 are example flow charts illustrating various methods for detecting potential data quality problems, in accordance with some implementations.

FIG. 2 is an example flow chart illustrating a method 200 for detecting potential data quality problems in accordance with some implementations. In some implementations, the method is implemented at a data quality detection system 140 or at a data processing system 120. In some implementations, the data quality detection system 140 is part of the data processing system 120, or vice versa. In some implementations, the data quality detection system 140 is independent (e.g., separate) from the data processing system 120, e.g., each belonging to different owners or operated independently from each other.

In some implementations, the data processing system 120 first obtains (202) a group of enterprise data, e.g., from the enterprise storage 106. In some implementations, the enterprise data include business information (e.g., describing business organizations that are potential business clients), such as customer addresses, business structures (partnership or LLC), phone numbers, and supplier or client profiles.

In some implementations, the data processing system 120 processes (250) the enterprise data as follows: cleansing (252) the enterprise data, matching (254) the enterprise data, and forming (256) best records.

In some implementations, the data processing system 120 generates (260) side effect data after (or while) processing the enterprise data. For example, a cleanse operation (252) can generate side effect data (e.g., misspelled names or addresses) and saves them into a side effect table (separate from the enterprise data). In other cases, side effect data are also generated by a match operation (254) or a best-record forming operation (256).

In some implementations, side effect data (or a portion thereof) is provided to the data quality detection system 140, for quality detection/estimation purposes.

In some implementations, to detect potential data quality problems, the quality detection system 140 selects (204) side effect data (or a portion thereof), and based on information (e.g., one or more data fields) within the side effect data (or a portion thereof), selects (206) a set of data quality detection rules. For example, if (A) the "Country" column in a side effect data set includes only the value "USA," and (B) the "Address Type" column includes only "Residential Postal Addresses"; then syntax rules governing residential postal addresses in the United States are selected (e.g., a street number must precede a street name, and a zip code should include only numeric values and optionally a hyphen).

In some implementations, the data quality detection system 140 then examines (208) the side effect data (e.g., generated by the cleanse operation 252, the matching operation 254 or a best-record forming operation 256) in accordance with the selected data quality detection rules. For example, the data quality detection system 140 scans a spreadsheet containing U.S. postal addresses to determine whether each addresses listed therein includes a street number (often a numeric value) followed by a street name (often an alpha-numeric value) and whether the zip code portion includes only numeric values (except for a hyphen).

In some implementations, after a (partial or full) examination of the side effect data 210, the data quality detection system 140 identifies (210) candidate (e.g., potential) data quality problems. For example, a listed commercial address is suspected to be incorrect because it includes an apartment number; for another example, a listed cell phone number is identified as false because it has been registered to a landline.

In some implementations, the data quality detection system 140 further presents (212) candidate (e.g., potential) solutions to the identified problems. For instance, after identifying several address entries as also including persons' names (e.g., Zheng Liu Jr., or Jim Smith III), the data quality detection system 140 provides, to a user 150 (e.g., a data analyst), a program (e.g., a software routine or function) for removing the persons' names from these address entries.

In some implementations, the data quality detection system 140 also examines the enterprise data (or a portion thereof) in order to present potential solutions to any potential data quality problems detected.

In some implementations, the user 150 reviews the proposed solutions and optionally adopts (214) a proposed solution. In some implementations, the user 150 takes (216) actions in addition to or in place of the proposed solutions, such as (1) executing additional data processing scripts to also remove business names (e.g., Good Baby Sitter Inc.,) from address entries, (2) recognizing a suspect data entry as legitimate, and (3) identifying a potential problem as non-serious and resuming the data quality detection.

In some implementations, in accordance with a user's actions (e.g., 214 or 216), the data quality detection system 140 corrects (218) one or more candidate (e.g., potential) data quality problems and resumes (220) the quality detection process (e.g., selecting a different set of data quality detection rules in order to detect potential problems in another data set or to detect different type of problems in the same data set).

In some implementations, correcting (218) one or more candidate (e.g., potential) data quality problems include a rerun of one or more data processing operations (e.g., 252-256) that generated the side effect data in the first place, e.g., so as to verify that the quality problems have been fixed. In some implementations, a quality problems is fixed when no side effect data is generated. In other implementations, a quality problems is fixed when side effect data indicate as such.

In some implementations, the data quality detection operations (e.g., 204-220) are performed before a data cleanse operation (252) begins. For example, a Cleanse operation configured to cleanse address data requires certain key address components to be present. Profiling results can be analyzed before a Cleanse operation begins to determine whether these key address components are present, in order to predict whether the Cleanse operation will be successful. For another example, during the initialization of a Cleanse process, if the detection system 140 determines that no address reference data (and associated data quality detection rules) are available, the data processing system 120 will not begin the Cleanse process, because it will not likely be successful.

In other implementations, the data quality detection operations (e.g., 204-220) are performed after a matching operation (254), but before best records are formed (256). For example, after a Match operation reads data and forms collections of records in memory, but before starting the more time-consuming task of comparing records, an analysis of the count distribution of records in the collections can be done (as part of a quality detection process) to estimate the duration of time that the comparison process is going to take. If the estimated time is outside an expected range of time for the number of input records, then the Match operation will likely produce unexpected results if the estimated time is less than the minimum duration in the range, and will likely take longer to complete than expected if the estimated time is greater than the maximum duration in the range.

In still other implementations, the data quality detection operations (e.g., 204-220) are performed after best records are formed 256. This is advantageous, because some potential problems can be better identified after data process operations are finished. For instance, data quality for a particular combination of dimensions (e.g., the quality of phone data for customers in Italy from an ERP source) cannot be determined until all of the phone data has been cleansed and one or more aggregations are computed.

Figure 3:
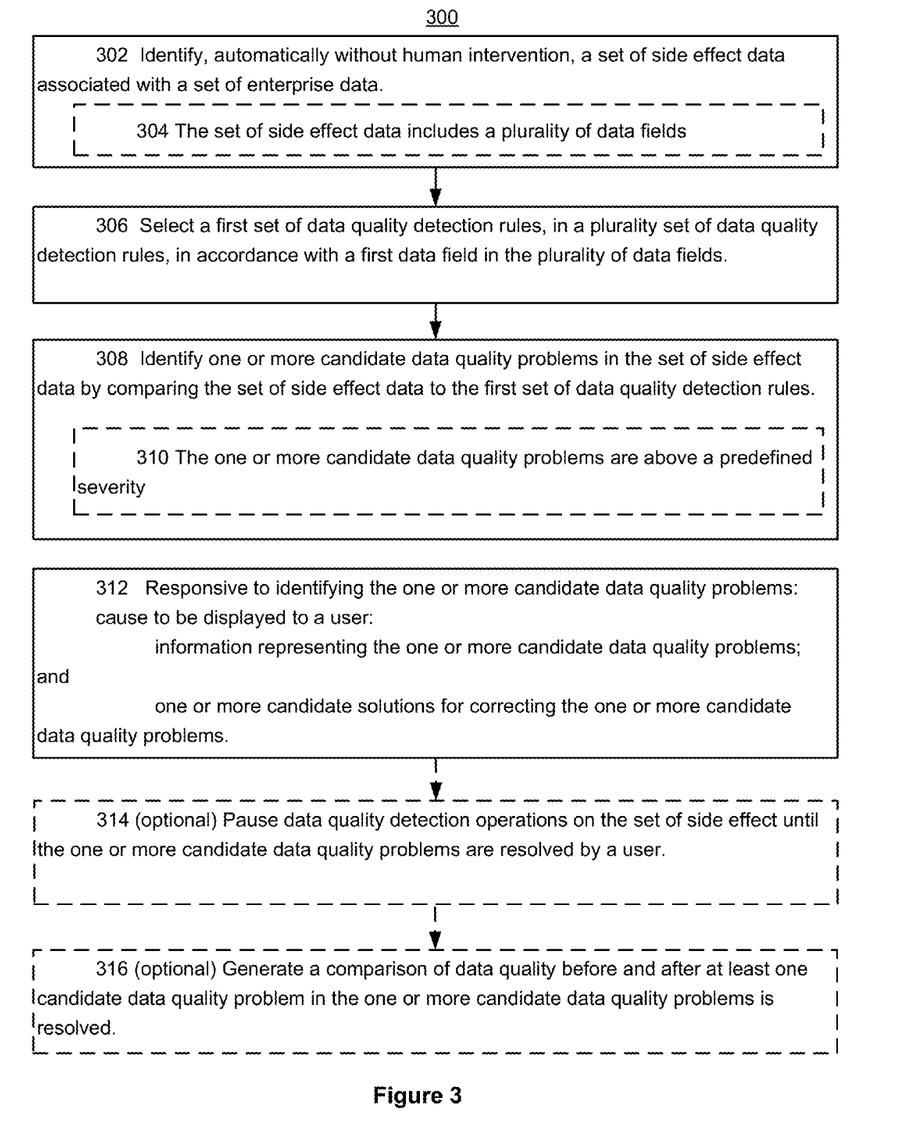

FIG. 3 is example flow chart illustrating a method 300 for detecting potential data quality problems in accordance with some implementations. In some implementations, the method is implemented at a computing device (e.g., a desktop computer, a laptop, a notebook, a tablet computer, a smart phone, and a sever computer), which includes one or more processors and memory storing one or more programs for execution by the one or more processors.

In some implementations, the method is executed automatically without human intervention. Automatic quality detection is technically advantageous because it requires minimal user invention, and thus increases efficiency.

In some implementations, the method includes, identifying (302) a set of side effect data associated with a set of enterprise data (e.g., potential quality problems within the enterprise data). The set of side effect data includes (304) a plurality of data fields. For example, from phone numbers and address collected for potential customers in 10 different countries, the detection system 140 selects landline numbers and non-P.O. Box addresses for potential customers residing in the United States, as a subset.

In some implementations, the method then selects (306) a first set of data quality detection rules, in a plurality set of data quality detection rules, in accordance with a first data field in the plurality of data fields. For example, when a data set is expected to include landline numbers and postal addresses for potential customers in the United States, known formats or syntax for U.S. landline numbers (e.g., ten digits with or without hyphen or parenthesis) and postal addresses (e.g., street number (digits), street name (alpha-numeric), city, state, zip code (five or nine digits)) is selected.

In some implementations, after the first set of data quality detection rules is selected, the method proceeds to identify (308) one or more candidate data quality problems in the subset of data by comparing the set of side effect data to the first set of data quality detection rules. To continue with the above example, if a landline (phone number) data entry includes non-numeric values (e.g., the letter "C"), this data entry is suspected to be incorrect and thus identified as a potential data quality problem.

In some implementations, the one or more candidate data quality problems are above a predefined severity level (310). In some cases, potential data quality problems are categorized by seriousness or severity. For example, sometimes, only critical potential problems are detected and identified for a user, when a data set is expected to have low quality.

In some case, once a predefined number of potential data problems are identified, the detection process is paused and user intervention (e.g., direction) is requested. For example, after detecting 500 potential errors in a data set including approximately 700 data entries (which may indicate poor data quality), it may be desirable for a user to intervene at an early stage, e.g., giving directions on whether to continue or to abort.

Figure 4:
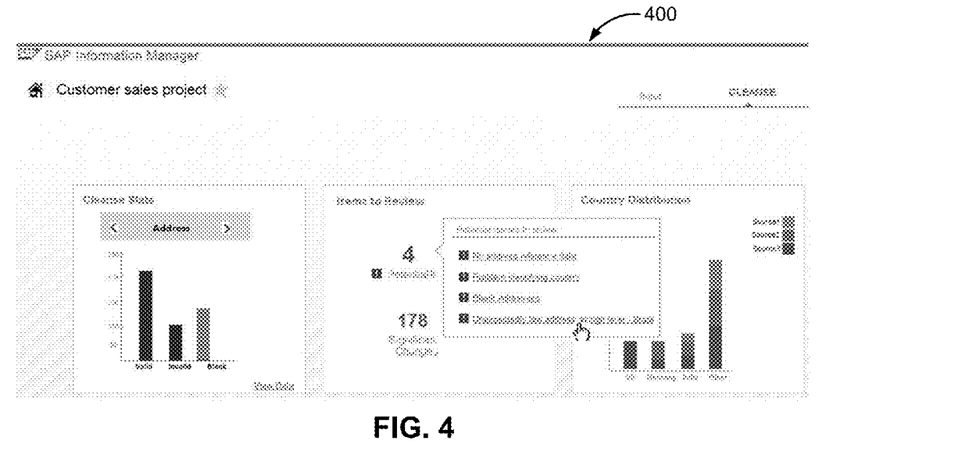
FIGS. 4-7 are screen images demonstrating an example user interface for detecting potential data quality problems, in accordance with some implementations.

In some implementations, responsive to identifying the one or more candidate data quality problems, the detection system 140 causes (312) to be displayed (e.g., formats for display) to a user: (A) information representing the one or more candidate data quality problems; and (B) one or more candidate solutions for correcting the one or more candidate data quality problems. For example, as shown in FIG. 4, when a predefined (e.g., a threshold) number of potential data quality problems 402 have been identified, a data quality analysis 404 (e.g., a summary or report) is displayed to a user. In some case, the analysis includes not only potential problem identified, but also potential solutions (e.g., check whether reference data exist, or check whether a data mapping is accurate).

Figure 5:
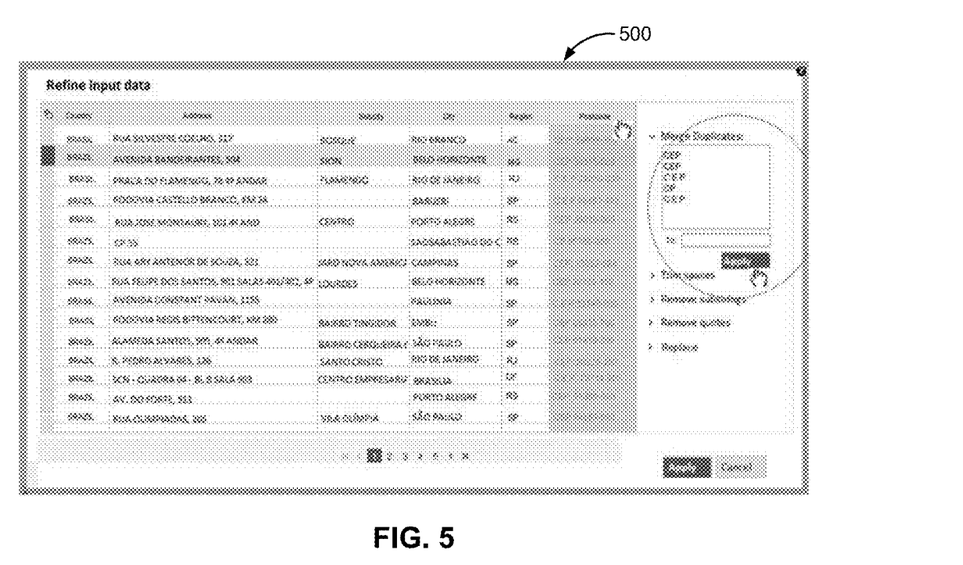

As shown in FIG. 5, when a potential problem is selected, potential solutions are provided to a user. Some data quality problems can be resolved within the detection system 140 (e.g., without terminating the detection process, if it has not been completed). For example, as shown in FIG. 4, is a user selects item "Unexpectedly low address assign level—Brazil", the affected Brazil addresses are displayed. Next, a more in-depth analysis of the affected records is performed, in this case, pattern profiling, in order to provide the user a potential solution. In this case, it automatically detects that data in the "postcode" column is alpha-numeric when Brazil postcodes should be numeric. Then, an "auto-fix" program is provided to the user so that these problem may be corrected. This eliminates the need for people in an organization from having to know the data nuance intricacies in all countries that they do business.

In some implementations, the enterprise data (or a portion thereof) are processed to form best records. In some implementations, processing the enterprise data includes one of: data cleansing, data matching, and forming best records. For example, the data processing system 120 processes data obtained from the enterprise storage 106 by cleaning the data, matching the cleansed data, and forming best records using the cleansed and matched data. In some cases, best records are formed after one or more steps of the detection process to take advantage thereof.

In some implementations, the side-effect data are generated after the data cleaning. In other implementations, the side-effect data are generated after the data matching. In still other implementations, the side-effect data are generated after the forming best records.

Early data quality detection is advantageous: identifying potential data quality problems before processing an entire enterprise data set, or knowing when a processing operation is only 20% complete, can increase efficiency significantly. The alternative of waiting until an operation is fully completed, only to then discover that a large number of errors had occurred can cause user frustrations, especially when a data quality detection could have prevented it. Even the potential problems that cannot be detected until a processing operation completes and aggregates are computed are valuable to know at this point in time rather than later, because typical work flows that involve data quality include multiple iterations of cleansing data, matching data, and forming best records. User frustrations arise when problems of poor quality that can be fixed during the Cleanse operation, or problems of missing duplicates or finding false positives can be fine-tuned during the Match operation, are not discovered until the full work flow is completed and best records are formed. Because in these cases, a massive amount of data backup and analytics re-run after making the fix in the appropriate operation in the workflow might be required. Besides user frustration, these processes can destruct enterprise data (which are business assets) if potential problems are not discovered until results of the best records are integrated back into the system.

As discussed above, however, data quality detections are also conducted in parallel to or after data processing operations. In other implementations, the method is executed while the enterprise data are being processed to form best records. In other implementations, the method is executed after the enterprise data have been processed to form best records.

In some implementations, the one or more candidate data quality problems are stored in a side-effect data table separate from the enterprise data. These techniques are advantageous: This way, the enterprise data are not contaminated by the side-effect data or an analysis or presentation thereof.

In some implementations, data quality detection operations are paused (314) until the one or more candidate data quality problems are resolved by a user. For example, when a predefined number of showstopper errors have occurred (e.g., no reference data is available for comparison, or 500 errors have been detects from a data set having 550 data entries), quality detections are paused to request user intervention.

In some implementations, the method further includes, generating (314) a comparison of data quality before and after at least one candidate data quality problem in the one or more candidate data quality problems is resolved.

Figure 6:
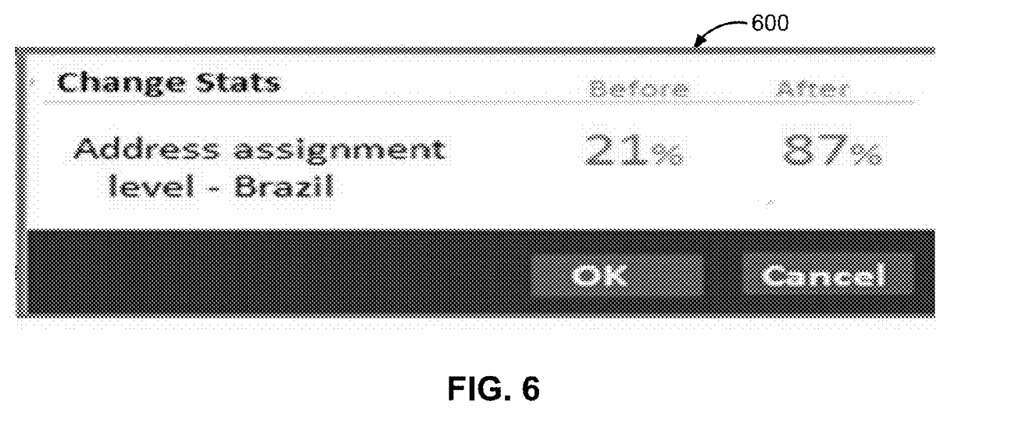

For example, after refining the input data by removing the alpha variations (FIG. 5), applying the fixes (FIG. 5), and re-running the Brazil addresses through the Cleanse operation, another analysis is performed and, as shown in FIG. 6, a before-and-after statistic is presented in order to validate that the change is desired and that the previously detected problems have been resolved, in part or in full.

In some implementations, the one or more candidate solutions are selected in accordance with the first set of data quality detection rules. For example, the detection system proposes solutions based on known formatting or syntax rules it has used to detect quality problem. For instance, based on what components are required to be presented in a Chinese postal address, the detection system suggests that zip codes are missing or an address should be revised to have state and city names appear before a street name.

In some implementations, the one or more candidate solutions are selected in accordance with user actions taken with respect to a second set of candidate data quality problems having a predefined similarity to the one or more candidate data quality problems. For example, if a user has frequently chosen to ignore a certain type of data quality problem (e.g., wrong zip code), it may be concluded that the user regards this type of problem as non-serious, and when similar problems arise again, one recommended solution is to simply ignore these potential errors, and another is to recommend a user to change default settings such as future similar error are not report at all.

In some implementations, the method further includes, separating data affected by the one or more candidate data quality problems from the enterprise data. For example, after detecting 50 potential errors in a data set having 10,000 entries, data entries affected by these potential errors are separated (e.g., saved in a different table or export to a separate spreadsheet), so that best records can be formed (e.g., at least partially) on the remaining entries, even before all potential errors are corrected. This is advantageous, as it allows time-critical enterprise data to be analyzed and business intelligence derived, even if all potential data errors are corrected, which can be time-consuming.

In some implementations, the method includes, continuing identifying candidate data quality problems in the enterprise data in accordance with the set of side effect data. For example, when a user has corrected one or more potential problems, data quality detections (if they have not been fully completed) can be resumed from the point (e.g., the last data entry examined) when the detected paused or terminated. These techniques are advantageous, especially when a data set is relatively large, as they allow resumption after a breakpoint, thereby increase detection efficiency.

In some implementations, the method further includes, causing to be displayed to the user, concurrently with information representing the one or more candidate data quality problems: (C) one or more candidate causes associated with the one or more candidate data quality problems. For example, as shown in FIG. 5, a user is notified of potential problems, as well as reasons why these problem had occurred, e.g., "no address reference data."

In some implementations, the method described above is executed in an enterprise resource planning (ERP) application, such as the SAP Accounting and Financial Close application, and the SAP Asset Analytics rapid-deployment solution application.

In some implementations, the method further includes, collecting user feedback associated with the one or more candidate solutions for correcting the one or more candidate data quality problems. For example, after proposing (e.g., suggesting) several potential solutions to the detected errors, the detection system 140 determines which proposed solution, if any, a user has adopted or has not adopted, and, bases on these feedback, proposes similar solutions in future similar scenarios, because they have been proven effective or considered favorable.

In some implementations, the user feedback associated with the one or more candidate solutions is explicit or implicit. For example, if a proposed solution has not been adopted by a user in the past 10 detections, the detection system 140 considers this proposed solution ineffective (e.g., based on user inaction) and will not offer the proposal in future similar scenarios. For example, if a proposed solution has been affirmatively chosen (as opposed to accept by default) by a user, the detection system 140 considers this proposal effective and will offer this proposal as a preferred option in future similar scenarios.

FIG. 4 is a screen illustrating an example user interface for detecting potential data quality problems in accordance with some implementations.

As shown in FIG. 4, in some implementations, when a user selects a potential data quality problem, e.g., from a list of potential problems, the detection system 140 proposes several potential solutions 402 to the selected problem.

FIG. 5 is a screen illustrating an example user interface for detecting potential data quality problems in accordance with some implementations.

In some implementations, a proposed solution enables a user to resolve quality problems within the detection application. As shown in FIG. 5, if a user selects the fourth item on the circled list, "Unexpectedly low address assign level—Brazil," the affected Brazil addresses are displayed. Because, in this case, a specific problem is identified by a user (e.g. for further resolution), a more in-depth analysis (e.g., pattern profiling) of the affected records is performed, to provide the user with a more detailed suggestion of what the problem could be. In this case, the detection system 140 it automatically detects that the data in the "Zip Code" column is alpha-numeric when postcodes in Brazil include only numbers, and thus automatically providing an "auto-fix" to a user, which once accepted, will resolve potential errors in affected records. These techniques eliminate or reduce the need for users to know all data nuances and intricacies relating to their enterprise data.

FIG. 6 is a screen illustrating an example user interface for detecting potential data quality problems in accordance with some implementations.

As shown in FIG. 6, after refining the input data by removing the alpha variations, applying the fix, and re-running the Brazil addresses through a Cleanse operation, another analysis is performed and a before-and-after statistic 600 is presented in order to validate that the changes are desired and that (e.g., at least some of) the previously detected problems have been corrected.

Figure 7:
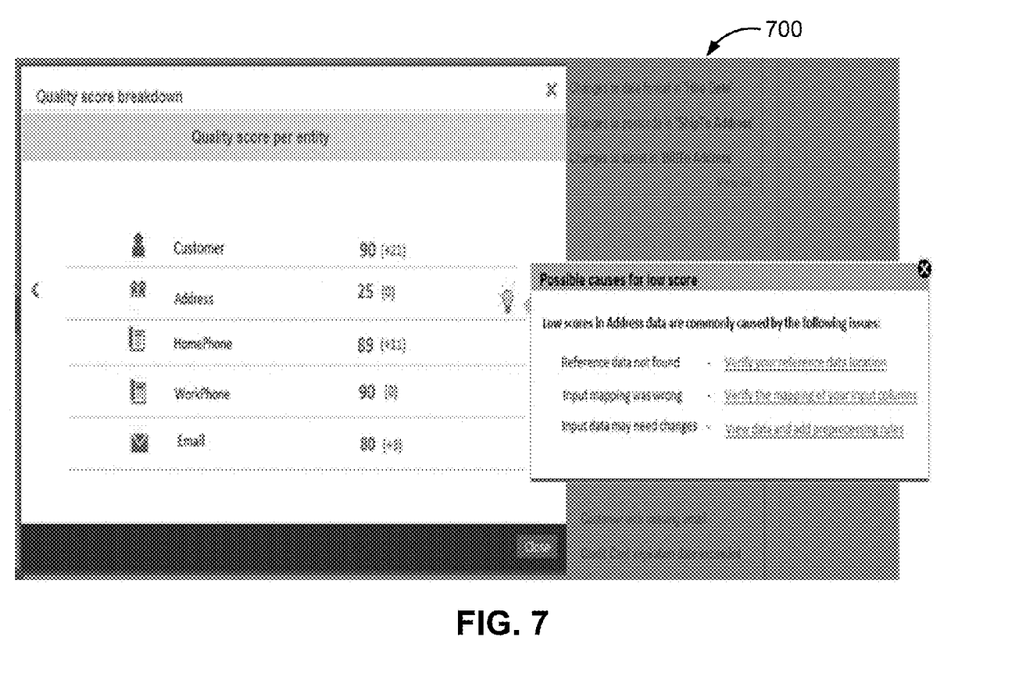

FIG. 7 is a screen illustrating an example user interface for detecting potential data quality problems in accordance with some implementations.

In some cases, the detection system 140 is unable to fully resolve all detected problems, and thus user actions outside the detection system 140 may be required; it therefore may be useful to advise a user on how to proceed. As shown in FIG. 7, for the errors "No address reference data" and "Blank addresses," a data administrator (or users with similar system privilege) might need to step in to check data mappings between reference data and target data and to check connections between the detection system 140 and the enterprise storage 106, respectively.

Concerning "no address reference data," for example, the owner of the data set may know that licenses for access the reference data (e.g., customer information for European countries), and after contacting a system or database administrator, discovers that while the appropriate reference data have been misplaced, e.g., not made available on a data server from which a Cleanse operation expected data.

Concerning the problem of blank addresses, the owner of the data finds this suspicious and after contacting the responsible people in IT, it was discovered that a wrong data importing/loading script was used, and thus while the enterprise data set includes correct addresses, these addresses were not correctly loaded into a data source used by the Cleanse operation. In these cases, instead of attempting to resolve data problems within the detection system, a user is advised by the detection system to investigate outside the detection system and offered possible leads.

By these ways, a user of the detection system can either resolve potential data quality problem within the detection system (thereby reducing overhead) or follow lead information advised by the detection system to investigate and correct these problems more promptly.

Figure 8:
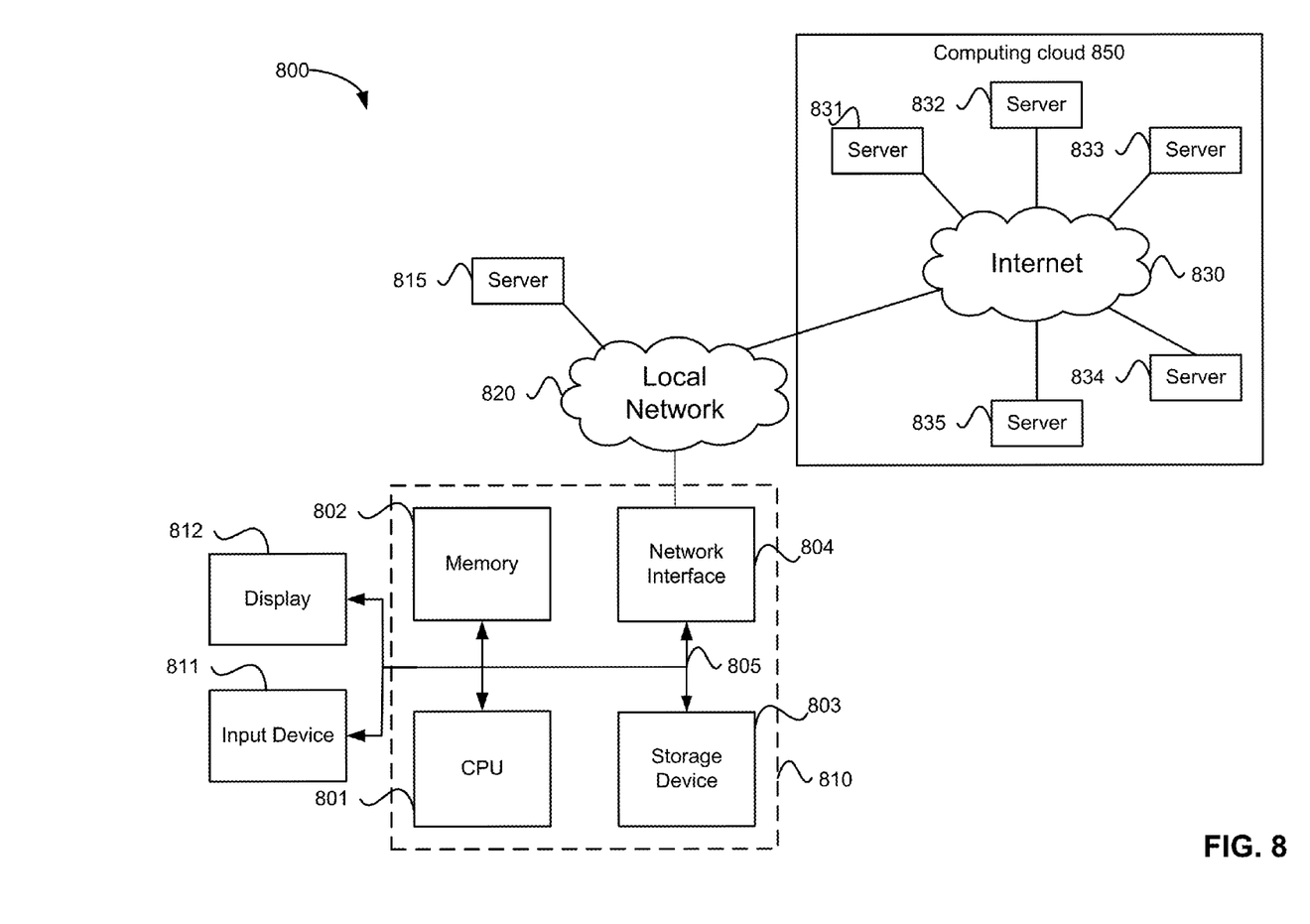
FIG. 8 is an example block diagram illustrating a computing system for detecting potential data quality problems, in accordance with some implementations.

FIG. 8 is an example block diagram illustrating an example computing system in accordance with some implementations.

As shown in FIG. 8, in some implementations, the computing system 810 includes a bus 805 or other communication mechanism for communicating information, and a processor 801 coupled with the bus 805 for processing information. In some implementations, the computing system 810 also includes a memory 802 coupled to bus 805 for storing information and instructions to be executed by processor 801, including information and instructions for performing the techniques described above, for example. In some implementations, the memory 802 may also be used for storing variables or other intermediate information during execution of instructions to be executed by processor 801. In some implementations, the memory 802 includes, but is not limited to, random access memory (RAM), read only memory (ROM), or both. A storage device 803 is also provided for storing information and instructions. Common forms of storage devices include, for example, a hard drive, a magnetic disk, an optical disk, a CD-ROM, a DVD, a flash memory, a USB memory card, or any other medium from which a computing system can obtain information. In some implementations, the storage device 803 may include source code, binary code, or software files for performing the techniques above, for example. The storage device 803 and the memory 802 are both examples of computer readable mediums.

In some implementations, the computing system 810 may be coupled via the bus 805 to a display 812, such as a cathode ray tube (CRT) or liquid crystal display (LCD), for displaying information to a user. An input device 811 such as a keyboard and/or mouse is coupled to the bus 805 for communicating information and command selections from the user to the processor 801. The combination of these components allows the user to communicate with the computing system 810. In some systems, the bus 805 may be divided into multiple specialized buses.

In some implementations, the computing system 810 includes a network interface 804 coupled with the bus 805. In some implementations, the network interface 804 provides two-way data communications between the computing system 810 and the local network 820. In some implementations, the network interface 804 includes a digital subscriber line (DSL) or a modem to provide data communication connection over a telephone line, for example. Another example of the network interface 804 is a local area network (LAN) card to provide a data communication connection to a compatible LAN. Wireless links are another example. In any such implementation, the network interface 804 sends and receives electrical, electromagnetic, or optical signals that carry digital data streams representing various types of information.

In some implementations, the computing system 810 sends and receives information, including messages or other interface actions, through the network interface 804 across a local network 820, an Intranet, or the Internet 830. In some implementations, the local network, the computing system 810 communicates with a plurality of other computer machines, such as a server 815. In some implementations, the computing system 810 and server computer systems represented by the server 815 form a cloud computing network, which may be programmed with processes described herein. In the Internet example, software components or services may reside on multiple different computing systems 810 or servers 831-835 across the network. In some implementations, the processes described above are implemented on one or more servers. In some implementations, the server 831 transmits actions or messages from one component, through the Internet 830, the local network 820, and the network interface 804 to a component of the computing system 810. In some implementations, the software components and processes described above are implemented on any computer system and send and/or receive information across a network.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the implementation(s). In general, structures and functionality presented as separate components in the example configurations may be implemented as a combined structure or component. Similarly, structures and functionality presented as a single component may be implemented as separate components. These and other variations, modifications, additions, and improvements fall within the scope of the implementation(s).

It will also be understood that, although the terms "first," "second," etc. may be used herein to describe various elements, these elements should not be limited by these terms. These terms are only used to distinguish one element from another. For example, a first set could be termed a second set, and, similarly, a second set could be termed a first set, without changing the meaning of the description, so long as all occurrences of the "first set" are renamed consistently and all occurrences of the "second set" are renamed consistently. The first set and the second set are both sets, but they are not the set.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined (that a stated condition precedent is true)" or "if (a stated condition precedent is true)" or "when (a stated condition precedent is true)" may be construed to mean "upon determining" or "in response to determining" or "in accordance with a determination" or "upon detecting" or "in response to detecting" that the stated condition precedent is true, depending on the context.

The foregoing description included example systems, methods, techniques, instruction sequences, and computing machine program products that embody illustrative implementations. For purposes of explanation, numerous specific details were set forth in order to provide an understanding of various implementations of the inventive subject matter. It will be evident, however, to those skilled in the art that implementations of the inventive subject matter may be practiced without these specific details. In general, well-known instruction instances, protocols, structures and techniques have not been shown in detail.

The foregoing description, for purpose of explanation, has been described with reference to specific implementations. However, the illustrative discussions above are not intended to be exhaustive or to limit the implementations to the precise forms disclosed. Many modifications and variations are possible in view of the above teachings. The implementations were chosen and described in order to best explain the principles and their practical applications, to thereby enable others skilled in the art to best utilize the implementations and various implementations with various modifications as are suited to the particular use contemplated.

What is claimed is:

1. A method comprising:
   at a computing device having one or more processors and memory storing one or more programs for execution by the one or more processors:
   automatically without human intervention:
   identifying a set of side effect data associated with a set of enterprise data, wherein the set of side effect data includes a plurality of data fields;
   selecting a first set of data quality detection rules, in a plurality set of data quality detection rules, in accordance with a first data field in the plurality of data fields;
   identifying one or more candidate data quality problems in the set of side effect data by comparing the set of side effect data to the first set of data quality detection rules;
   responsive to identifying the one or more candidate data quality problems:
      causing to be displayed to a user:
         information representing the one or more candidate data quality problems; and
         one or more candidate solutions for correcting the one or more candidate data quality problems.

2. The method of claim 1, wherein the enterprise data are processed to form best records.

3. The method of claim 2, wherein the side-effect data are generated after the forming best records.

4. The method of claim 1, wherein processing the enterprise data includes data cleansing.

5. The method of claim 4, wherein the side-effect data are generated after the data cleansing.

6. The method of claim 1, wherein the side-effect data are generated after a data matching comprising deriving an association among different data sets.

7. The method of claim 1, wherein the side effect data include information representing one or more candidate data quality problems and are stored in a side-effect data table separate from the enterprise data.

8. The method of claim 1, wherein the one or more candidate data quality problems are above a predefined severity level.

9. The method of claim 8, further comprising: pausing data quality detection operations on the subset of data until the one or more candidate data quality problems are resolved by a user.

10. The method of claim 1, further comprising:
    generating a comparison of data quality before and after at least one candidate data quality problem in the one or more candidate data quality problems is resolved.

11. The method of claim 1, wherein the one or more candidate solutions are selected in accordance with the first set of data quality detection rules.

12. The method of claim 1, wherein the one or more candidate solutions are selected in accordance with user actions taken with respect to a second set of candidate data quality problems having a predefined similarity to the one or more candidate data quality problems.

13. The method of claim 1, further comprising: separating data affected by the one or more candidate data quality problems from the enterprise data.

14. The method of claim 13, further comprising: continuing identifying candidate data quality problems in the enterprise data in accordance with the set of side effect data.

15. The method of claim 1, further comprising:
    causing to be displayed to the user, concurrently with information representing the one or more candidate data quality problems:
    one or more candidate causes associated with the one or more candidate data quality problems.

16. The method of claim 1 is executed in an enterprise resource planning (ERP) application.

17. The method of claim 1, further comprising: collecting user feedback associated with the one or more candidate solutions for correcting the one or more candidate data quality problems.

18. The method of claim 17, wherein the user feedback associated with the one or more candidate solutions is explicit or implicit.

19. A non-transitory computer readable storage medium storing one or more programs, the one or more programs comprising instructions, which when executed by a computing system with one or more processors, cause the computing system to execute a method of: automatically without human intervention:
    identifying a set of side effect data associated with a set of enterprise data, wherein the set of side effect data includes a plurality of data fields;
    selecting a first set of data quality detection rules, in a plurality set of data quality detection rules, in accordance with a first data field in the plurality of data fields;
    identifying one or more candidate data quality problems in the set of side effect data by comparing the set of side effect data to the first set of data quality detection rules;
    responsive to identifying the one or more candidate data quality problems:
       causing to be displayed to a user:
          information representing the one or more candidate data quality problems; and
          one or more candidate solutions for correcting the one or more candidate data quality problems.

20. A computing system, comprising:
    one or more processors;
    memory; and
    one or more programs, wherein the one or more programs are stored in the memory and configured to be executed by the one or more processors, the one or more programs including instructions for:

automatically without human intervention:
identifying a set of side effect data associated with a set of enterprise data, wherein the set of side effect data includes a plurality of data fields;
selecting a first set of data quality detection rules, in a plurality set of data quality detection rules, in accordance with a first data field in the plurality of data fields;
identifying one or more candidate data quality problems in the set of side effect data by comparing the set of side effect data to the first set of data quality detection rules;
responsive to identifying the one or more candidate data quality problems:
  causing to be displayed to a user:
    information representing the one or more candidate data quality problems; and
    one or more candidate solutions for correcting the one or more candidate data quality problems.

\* \* \* \* \*